US011909829B1

(12) United States Patent
Liu et al.

(10) Patent No.: US 11,909,829 B1
(45) Date of Patent: Feb. 20, 2024

(54) ONLINE TESTING EFFICIENCY THROUGH EARLY TERMINATION

(71) Applicant: Amazon Technologies, Inc., Seattle, WA (US)

(72) Inventors: Yu Liu, Bothell, MA (US); Runzhe Wan, Secaucus, NJ (US); James McQueen, Seattle, WA (US); Doug Hains, Shoreline, MA (US); Rui Song, Seattle, WA (US); Roger Henry Castillo, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/336,802

(22) Filed: Jun. 16, 2023

(51) Int. Cl.
*H04L 67/143* (2022.01)

(52) U.S. Cl.
CPC ................... *H04L 67/143* (2013.01)

(58) Field of Classification Search
None
See application file for complete search history.

(56) References Cited

U.S. PATENT DOCUMENTS

| 2017/0083429 | A1* | 3/2017 | Pekelis | G06F 11/3612 |
| 2019/0227903 | A1* | 7/2019 | Sundaresan | G06F 11/3438 |
| 2022/0129765 | A1* | 4/2022 | Lindon | G06F 11/3688 |
| 2023/0075026 | A1* | 3/2023 | Zhang | G06F 11/34 |
| 2023/0252499 | A1* | 8/2023 | Xiang | G06Q 30/0201 |
| | | | | 705/7.29 |

OTHER PUBLICATIONS

U.S. Appl. No. 17/407,968, filed Aug. 20, 2021.
Demets, "Interim Analysis: The Alpha Spending Function Approach," Statistic in Medicine, 1994, vol. 13, pp. 1341-152.
Johari et al., "Peeking at A/B Tests," KDD 2017 Applied Data Science Paper, 9 Pgs.
Richardson et al., "A Bayesian Model for Online Activity Sample Sizes," 2022, 11 Pg.

\* cited by examiner

*Primary Examiner* — Mohamed Ibrahim
(74) *Attorney, Agent, or Firm* — Knobbe, Martens, Olson, & Bear, LLP

(57) ABSTRACT

The present disclosure generally relates to systems and methods for generating termination notification of an experiment to be presented through a user interface. In some implementation examples, a termination notification system generates a probability value that is valid as of a time period of an experiment at a predetermined point in time based on at least data sample obtained during the time period, predicted sample sizes of each time period of the experiment, or probability values generated prior to the time period. Responsive to determining that the probability value that is valid as of the time period satisfies a threshold value, the termination notification system causes the user interface to present the termination notification that, when selected, causes the experiment to terminate prior to completion of a predicted duration of the experiment.

20 Claims, 8 Drawing Sheets

500

STATISTICAL METHOD: ✓ P VALUE
502

PREDICTED DURATION: 8 weeks          CURRENT DURATION: 5 weeks
504                                   506

RECOMMENDATION: 508
Experiment can be terminated early due to significant treatment effect!

Metrics Details 510

| MEAN | % CHANGE | P VALUE | AVP VALUE |
|------|----------|---------|-----------|
| 18.429 | 0.051% | 0.03 | 0.04 |

512                                   514
(VIEW AVP VALUE CHART)                (ADJUST TYPE I ERROR RATE)

*FIG. 5*

ONLINE TESTING EFFICIENCY THROUGH EARLY TERMINATION

BACKGROUND

In randomized experiments like A/B tests, a starting point is typically a population of units, such as individuals, time periods, plots of lands, etc. A subset of the population may be assigned to a treatment group that is exposed to a new treatment, with the remainder of units being assigned to a control group (which will not receive the new treatment). After a period of time has passed, outcomes may be observed for the units. For example, average outcomes for units in the treatment group may be compared to average outcomes for units in the control group. Statistical analysis is typically performed using the outcomes to determine causal effects and/or correlations.

BRIEF DESCRIPTION OF THE DRAWINGS

FIG. 5 illustrates an example user interface for presenting early termination notification and other statistical results generated by a termination notification system, such as the termination notification system of FIG. 2.

DETAILED DESCRIPTION

Figure 1:
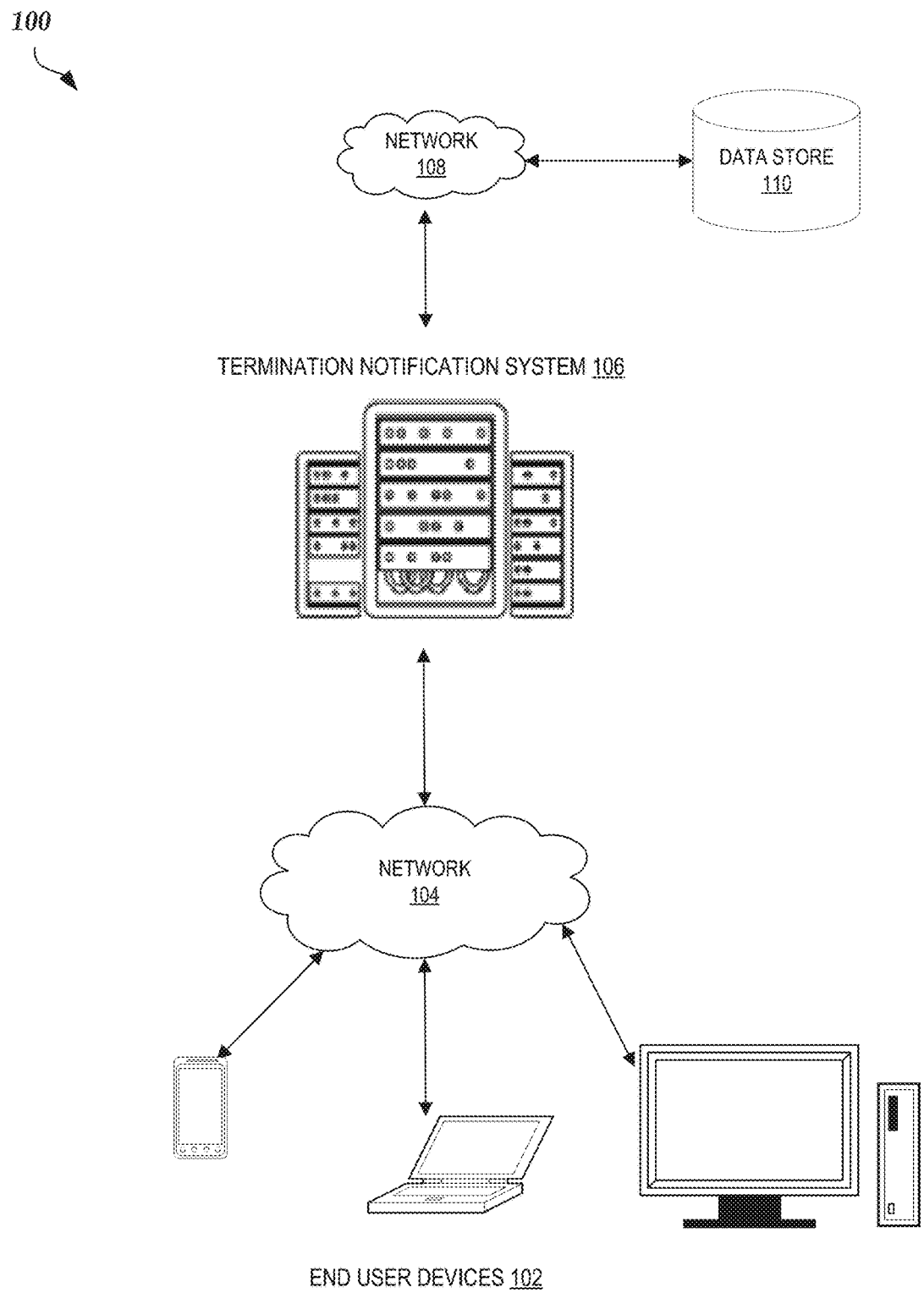
FIG. 1 depicts an example computing environment in which embodiments of the present disclosure can be implemented by a termination notification system to present early termination notification of an experiment to end user devices.

Generally described, aspects of the present disclosure relate to systems and methods that utilize various statistical techniques to allow experimenters to terminate tests early via a user interface without acting on statistically insignificant results. More specifically, some embodiments of the present disclosure relate to a network-based or online test platform that generates a probability value at predetermined timing and triggers a termination notification to be presented to experimenters through a user interface when the probability value satisfies a threshold value.

Online experiments, which are often referred to as "A/B tests," are randomized experiments which compare an online user's response to two (or more) versions of a network-based or online service, content page (e.g., network page, website, etc.), or the like. The versions are often called 'treatments,' denoted by 'A' and 'B.' This allows the owners of a product to infer how changing the treatment will impact the users' response. By convention, version A (also referred to as "Control") is the current, in-production version of a content page or computing service and version B (also referred to as "Treatment") is some new variation of the content page or computing service. To prevent experimenters making decisions based on invalid test results, some statistical concepts, such as Type I error, have been developed. A Type I error, or false positive, occurs when a statistical analysis rejects the null hypothesis of a test when the null hypothesis is actually true (e.g., when there is no statistically significant difference between the treatment and control groups). Testing platforms generally control Type I error rate around 5% by requiring a probability value (p-value) calculated from experimental data to drop below a significance level (alpha) that is set at 5%.

Traditionally, on-line testing platforms conduct experiments using a static duration that may be determined by a power analysis that returns the minimum duration needed for obtaining sufficient data samples to generate statistically significant results. However, as technology advances, experiments with static duration may be deficient to meet current needs in at least two aspects.

First, instead of refraining from viewing the results prior to completion of a test, experimenters tend to read or view the result pages multiple times during the middle of the test. For example, an experimenter may view the result pages during the middle of the test for various reasons, such as to determine the accuracy of the testing as quickly as possible. Such behavior, however, may lead to the appearance of an inflated Type I error because the Type I error calculation is traditionally produced under the assumption that the Type I error value is viewed once upon completion of the experiment. As a result, the experimenter may refrain from using version B of the content page or computing service as the in-production version even if the Type I error of version B is actually lower than the Type I error of version A, which could lead to poorer performance of the content page or service. To avoid inflating Type I error, an adjusted p-value (always valid p-value (AVP)) could be generated. For example, the AVP process may control Type I error by ensuring that the probability that the adjusted p-value drops below alpha is no larger than alpha.

Yet, the AVP process is generally premised on the assumption that experimenters may continuously monitor the results as testing is still running. Straightforward implementation of the AVP process may lead to numerous technical disadvantages. For example, generating the adjusted p-value with excessive frequency (e.g., generating a new value every time a new data sample is received) may result in a decrease of statistical power of a test. Further, more computing resources (e.g., power consumption, memory usage, processor usage, network usage, etc.) may be spent or wasted in constantly calculating and updating the results. In practice, experimenters may gain little by checking test results too frequently as it may not be necessary or result in improved content page or service performance to be able to make decisions at every conceivable point in time. As such, directly implementing the AVP process on a testing platform may lead to system inefficiency.

Second, as experimentation computing resources become more constrained or tighter, it may be desirable to terminate a test earlier before the originally predicted experiment duration expires so as to release computing resources for use in executing other operations, prevent further loss (e.g., due to poor performance of version B), or reduce opportunity cost, in particular when significant negative or positive impacts of variation have been observed. However, without proper adjustments, early termination of a test may also inflate Type I error because of premature interpretation of the statistics. To control Type I error under early termination, an alpha spending function approach can be implemented. Briefly speaking, instead of having a fixed significance level (e.g., a fixed alpha), alpha spending functions can adjust values of an alpha to account for situations where only fractional information may be available for statistical analysis during the middle of a test.

Yet, pure integration of the alpha spending function approach into a network-based or online testing platform may lead to inferior user experiences and less efficient usage of resources. For example, instead of viewing a fixed significance level (e.g., alpha is fixed at 0.05), an alpha having values that increase as time progresses may be displayed to experimenters through a user interface to allow experimenters the ability to terminate a test when a p-value drops below a corresponding alpha value. The varying alpha values may cause confusion to experimenters, especially less statistically sophisticated experimenters, who may make decisions based on comparison between the p-value and a wrong alpha value. As a result, the experimenter may make a selection (e.g., remain with version A, transition to version B) that results in poorer performance from the content page or computing service.

Additionally, direct implementation of the alpha spending function approach may lead to ignorance of statistical differences among different experiments, which may result in less optimal experiment termination timing. For example, for experiments having the same predicted duration, the alpha spending function approach may generate the same curve of alpha values across time as information fraction (e.g., a parameter associated with alpha spending functions) may be equally spaced (e.g., increasing from 0 to 1 with a constant step of 0.2). As such, a traffic pattern that may be unique to an experiment may not be accounted for when early terminating an experiment. Thus, it may be desirable to increase values of alpha more rapidly in the beginning of an experiment when large amount of experiment data is obtained early on so as not to unduly delay the termination of the experiment.

To address at least a portion of the technical problems described above, some embodiments of the present disclosure implement a modified combination of the always valid p-value (AVP) process and the alpha spending function approach to generate experiment termination notifications with controlled Type I error while maintaining system efficiency and enabling the presentation of user-friendly result page interfaces.

Specifically, to enable early termination of experiments using the alpha spending function approach without causing inferior user experiences by letting experimenters view and comparing varying alpha values to calculated p-values, some disclosed techniques combine the AVP process with the alpha spending function approach to generate adjusted p-values while keep the significance level, alpha, at a constant value. Unlike integrating the alpha spending function approach with p-values that adjust alpha values without adjusting p-values, some disclosed techniques generate adjusted p-values without adjusting alpha values. In some embodiments, the combination of the AVP process with the alpha spending function approach to generate adjusted p-values without adjusting alpha values can be implemented via use of equation (1), where $\rho_t$ is the adjusted p-value generated at time t, $\delta(\alpha)=1$ indicates rejection by the alpha spending function approach with a Type I error $\alpha$ and information fraction being (predicted accumulated sample size up to time t)/(predicted total sample size of an experiment), $T(\alpha)$ indicates the stopping time of the test being time t, and inf denotes choosing the minimum $\alpha$ in the set defined by equation (1) as the adjusted p-value.

$$\rho_t = \inf\{\alpha : T(\alpha) <= t, \delta(\alpha) = 1\} \quad (1)$$

As will be described below, equation (1) may be applied to calculate a finite number (e.g., 7, 8, 9, or 10) of adjusted p-values in accordance with some embodiments of the present disclosure.

By generating the adjusted p-value using the equation (1), the disclosed techniques may allow a testing platform to cause a presentation or display of adjusted p-values that are valid according to the AVP process (e.g., without inflated Type I error) and an alpha value that is fixed at a constant value (e.g., 0.05) through a user interface associated with the testing platform. As such, experimenters may be prevented from visually comparing varying alpha values to calculated p-values that may also vary and may more intuitively or easily interpret the presented statistical data (e.g., comparing adjusted p-values with a flat and constant alpha value).

Additionally, to generate adjusted p-values using the AVP process while avoiding inefficient use of system or computing resources resulting from direct application of the AVP process that may generate a new adjusted p-value each time an experiment data sample is obtained, some disclosed techniques generate adjusted p-values using the AVP process at finite (e.g., not approaching continuous), discrete, or predetermined points in time. In some embodiments, instead of generating a new adjusted p-value each time a new sample is obtained, disclosed techniques generate adjusted p-values according to a schedule that may be determined around the beginning of the experiment.

In some embodiments, an adjusted p-value may be generated once every week prior to the termination of the test. More specifically, at an end of a first week of an experiment, predicted sample size, mean and variance of the experiment may be determined based on experiment sample data obtained during the first week. The predicted sample size, mean and variance of the experiment may then be utilized to predict a duration (e.g., 7-10 weeks) of the experiment. Additionally, assuming the predicted duration of the experiment is 10 weeks, then a predicted sample size for each of the 10 weeks can also be determined at the end of the first week of the experiment. Accordingly, an adjusted p-value may be calculated at an end of each of the 10 weeks, resulting in 10 adjusted p-values generated if the experiment is not terminated early.

Techniques have been developed to predict sample size and a duration of an experiment. For example, U.S. patent application Ser. No. 17/407,968, filed on Aug. 20, 2021 and titled "SAMPLE SIZE AND DURATION PREDICTION FOR ONLINE ACTIVITY," the entirety of which is hereby incorporated by reference, describes statistical analysis methods for predicting sample size and duration of an experiment based on traffic observed around the beginning of the experiment.

To further improve system efficiency, some disclosed techniques disclose a method for deriving information fraction associated with the alpha spending function approach so as to generate alpha values that increase over time in a manner that reflects a particular or unique traffic pattern associated with a specific experiment. As mentioned above, the alpha spending function approach may generate the same curve of alpha values across time for experiments that have the same predicted duration, resulting in the same variation of alpha values even though some of the experiments may have higher traffic (e.g., obtaining more experiment data samples) in the beginning than others. Such practice may be inefficient in that experiments having higher traffic in the beginning may benefit from being given higher alpha values such that they may be legitimately terminated earlier than those having lower traffic.

In contrast, depending on the predicted traffic patterns for experiments that may have the same predicted duration, disclosed techniques may generate different curves of alpha values such that some experiments may be terminated earlier as they ought to be. Specifically, in some embodiments, the information fraction associated with the alpha spending function approach for first time period of the experiment may be calculated based on a ratio between the predicted sample size accumulated up to the first time period and the predicted sample size of the entire experiment. For example, for an experiment that is predicted to have a predicted duration of seven weeks, the information fraction associated with the alpha spending function approach for the first week of the experiment may be generated through dividing the predicted sample size of the first week of the experiment by the summation of the predicted sample size from the first week through the seventh week. Thus, if an experiment is predicted to have a higher traffic in the beginning weeks, the information fraction may increase faster, leading to faster increases in alpha values in the beginning weeks due to the operation of the information fraction that account for the higher traffic in the beginning weeks. As such, the experiment may terminate earlier as the adjusted p-values may drop below the alpha values more easily.

Notably, in some example implementations of the present disclosure, the proposed method for generating information fraction associated with the alpha spending function may be applied before the AVP process is combined with the alpha spending function approach to generate adjusted p-values while keep the significance level, alpha, at a constant value. As such, instead of displaying varying alpha values, what may be displayed to experimenters in a user interface is a fixed alpha value that may be more intuitive to experimenters.

As will be appreciated by one of skill in the art in light of the present disclosure, the embodiments disclosed herein improve the ability of computing systems to generate experiment termination notifications based on statistically significant results (e.g., without inflated Type I error) obtained at predetermined frequencies, thereby facilitating early termination of experiments to release more experimentation computing resources without wasting computing resources associated with overly frequent generation of probability values. Furthermore, the techniques described in the present disclosure enable computing devices to generate more user-friendly interfaces presenting statistical results that are easier to understand and act on. The utility of the present disclosure is further demonstrated by applying some of the disclosed techniques to enable experimenters to early terminate network-based or online experiments, such as network-based or online A/B testing. Thus, the present disclosure represents an improvement in computing platforms for testing content pages or computing services.

The foregoing aspects and many of the attendant advantages of this disclosure will become more readily appreciated as the same become better understood by reference to the following description, when taken in conjunction with the accompanying drawings.

FIG. 1 depicts an example computing environment 100 in which embodiments of the present disclosure can be implemented by a termination notification system 106 to present early termination notification of an experiment to end user devices 102. The computing environment 100 may include the termination notification system 106, the network 108, the data store 110, the network 104 and end user devices 102. The termination notification system 106 can be accessed by the end user devices 102 through the network 104. In some embodiments, the termination notification system 106 can be implemented by one or more computing devices (e.g., desktop, laptop and the like) for conducting network-based or online activities, such as facilitating network-based or online A/B testing or other randomized network-based or online experiments.

In some embodiments, the termination notification system 106 may be a part of a cloud provider network (e.g., a "cloud"), which may correspond to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to provide various services, such as collecting sample data associated with network-based or online experiments and performing statistical analysis techniques as disclosed in the present disclosure. The computing services provided by the cloud that may include the termination notification system 106 can thus be considered as both the applications delivered as services over a publicly accessible network (e.g., the Internet, a cellular communication network) and the hardware and software in cloud provider data centers that provide those services.

Additionally, end user devices 102 may communicate with the termination notification system 106 via various interfaces such as application programming interfaces (API) as a part of cloud-based services. In some embodiment, the termination notification system 106 may interact with the end user devices 102 through one or more user interfaces, command-line interfaces (CLI), application programing interfaces (API), and/or other programmatic interfaces for requesting actions, requesting services, initiating network-based or online experiments, requesting statistical results of network-based or online experiments, providing feedback data, and/or the like. For example, the termination notification system 106 may transmit through the network 104 early termination notification (e.g., generated by some of the statistical analysis techniques described in the present disclosure) of an experiment to the end user devices 102.

Various example end user devices 102 are shown in FIG. 1, including a desktop computer, laptop, and a mobile phone, each provided by way of illustration. In general, the end user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, experimenters may provide information (e.g., significance level for an experiment) associated with network-based or online experiments to the termination notification system 106 through the network 104. For example, the end user devices 102 may implement experiments and cause experiment sample data (e.g., data associated with traffic to treated websites, online services or products) associated with network-based or online experiments through an API to the termination notification system 106.

Alternatively, in some embodiments, network-based or online experiments may be implemented by the termination notification system 106. In these embodiments, experiment sample data may be obtained by the termination notification system 106 not through network 104 from end user devices 102. Rather, data associated with the experiment may be obtained by the termination notification system 106 and stored in an experiment data store (not shown in FIG. 1) of the termination notification system 106. Optionally and alternatively, experiment sample data may be stored in the data store 110 and provided to the termination notification system 106 through the network 108. In some examples, the termination notification system 106, the network 108 and the data store 110 may be a part of a cloud provider network mentioned above and may implement various computing resources or services, which may include performing statistical analysis techniques described in the present disclosure, a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated).

In some embodiments, the network 104 and/or the network 108 includes any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In operation, based on experiment sample data obtained during an experiment, the termination notification system 106 may conduct statistical analysis to generate a termination notification to be transmitted through the network 104 to end user devices 102. In some embodiments, the termination notification system 106 may generate adjusted probability values at predetermined timing (e.g., once every week) and triggers a termination notification to be presented to experimenters through a user interface of the end user devices 102 when the adjusted probability values satisfy a threshold value that may be adjustable by experimenters through various interfaces mentioned above (e.g., API). In some embodiments, the termination notification system 106 derives information fraction associated with an alpha spending function based on sample sizes predicted for each period of the experiment such that the experiment may be terminated earlier depending on traffic flow (e.g., how rapidly experiment data sample increases) that may be unique to the experiment.

Figure 2:
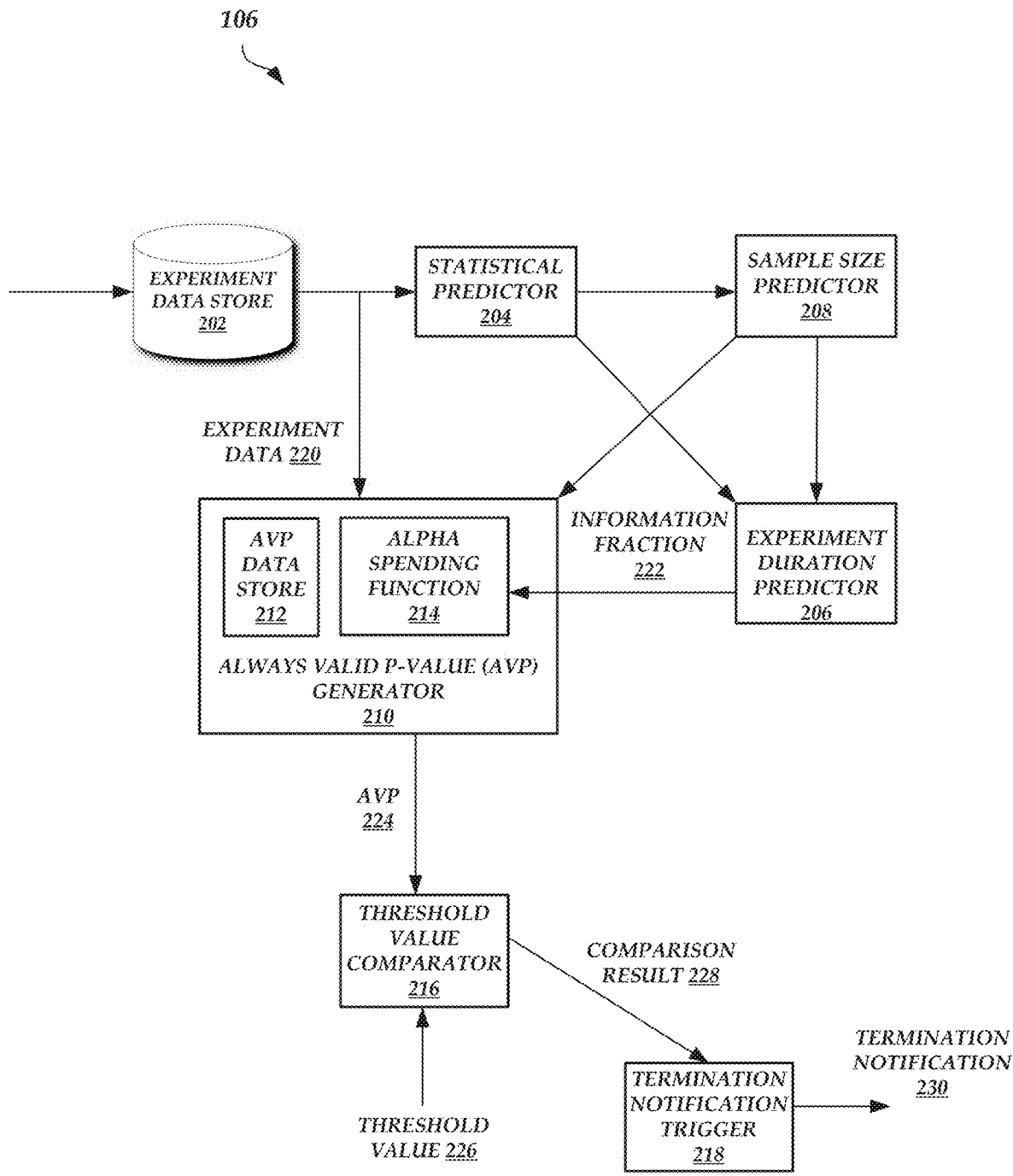
FIG. 2 depicts an example block diagram of the termination notification system of FIG. 1, where the termination notification system can be utilized to trigger termination notification to be presented through user interfaces, such as the user interfaces of the end user devices of FIG. 1.

FIG. 2 depicts an example block diagram of the termination notification system 106 of FIG. 1, where the termination notification system 106 can be utilized to trigger termination notification to be presented through user interfaces, such as the user interfaces of the end user devices 102 of FIG. 1 or the user interface (not shown in FIG. 2) of the termination notification system 106. The termination notification system 106 includes an experiment data store 202, a statistical predictor 204, an experiment duration predictor 206, a sample size predictor 208, an always valid p-value generator 210 that includes an AVP data store 212 and alpha spending function 214, a threshold value comparator 216 and a termination notification trigger 218.

Based on the experiment data 220 collected during a test and the information fraction 222 generated based on predicted sample size of the test, the AVP generator 210 may generate the always valid p-value (AVP) 224 for each period of the test. The threshold value comparator 216 may then compare the AVP 224 with a threshold value 226 and generate the comparison result 228 if the AVP 224 satisfies the threshold value 226 (e.g., value of the AVP 224 drops below the threshold value 226). Responsive to receiving the comparison result 228 that indicates the AVP 224 satisfies the threshold value 226, the termination notification trigger 218 may generate a termination notification 230 to cause a user interface of the end user device 102 to display the termination notification 230.

Figure 3A:
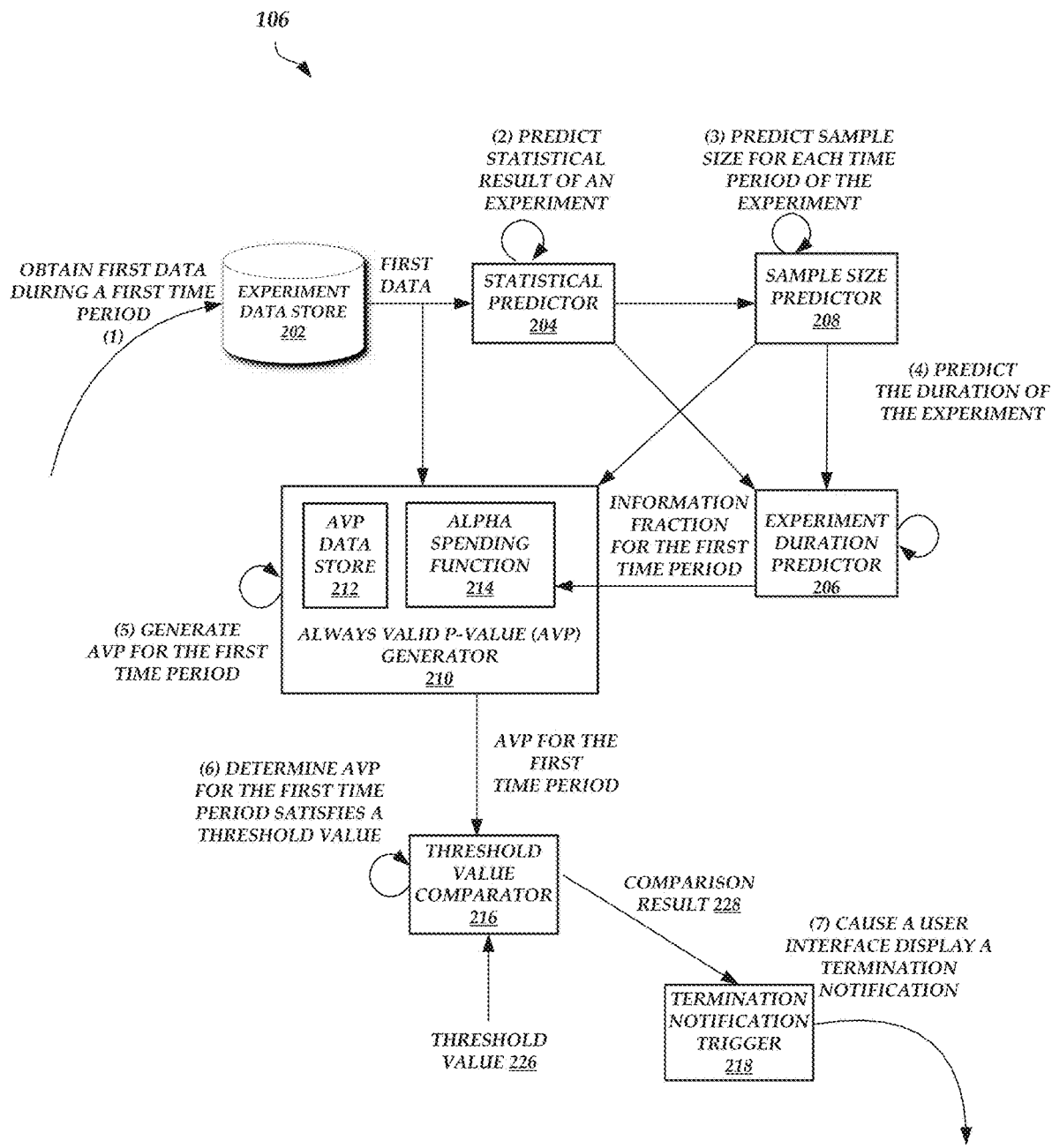
FIGS. 3A-3B depict example interactions for triggering termination notification of an experiment on the termination notification system in FIG. 2.
Figure 3B:
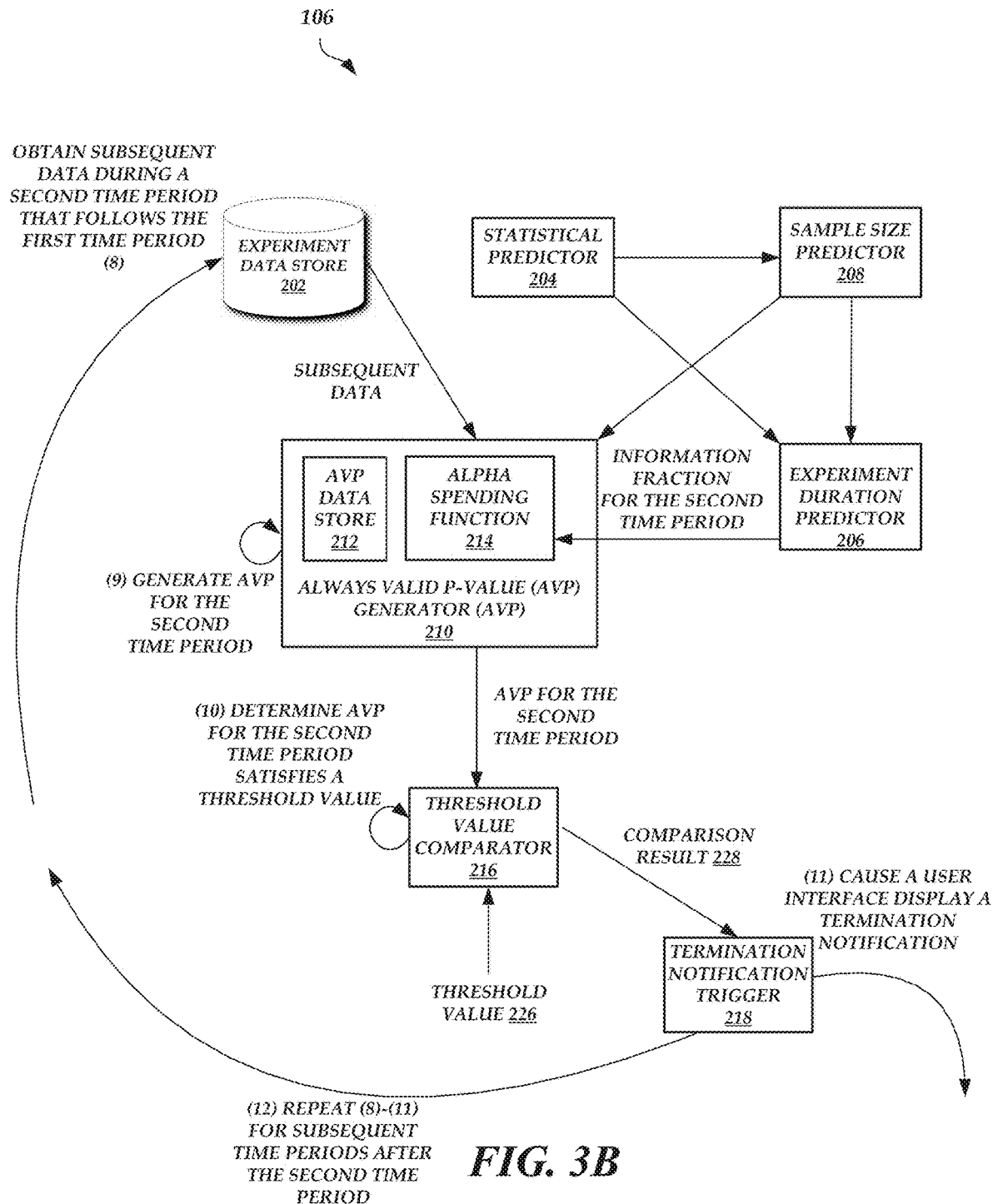

With reference to FIGS. 3A-3B, illustrative interactions will be described depicting how elements (e.g., the AVP generator 210 and the sample size predictor 208) of the termination notification system 106 of FIG. 2 can cause a user interface associated with an end user device 102 to display a termination notification based on statistically significant results (e.g., with Type I error rate controller below 0.05) without wasting computing resources resulting from overly frequent generation of statistical values.

The interactions of FIG. 3A begin at (1), where the experiment data store 202 obtains first data during a first time period of an experiment. For solely illustrative purposes, the following discussion may assume the first time period is one week. In other words, the first time period of the experiment may be the first week of the experiment. It should be noted, however, that the first time period of the experiment can be greater or less than one week.

Specifically, during the first week of the experiment, the termination notification system 106 may receive the first data from the network 104 or the network 108 and store the first data in the experiment data store 202 for further statistical analysis that will be described below. The first data may be generated associated with network-based or online users responses (e.g., clicks, purchases and/or other behavior associated with network-based or online users interactions with treated products, services, webpages or the like).

Accordingly, at (2), the statistical predictor 204 may predict statistical result of the experiment based on the first data. In some embodiments, the predicted statistical result may include the sample size, the sample mean and the sample variance of the entire experiment. For example, based on sample size or mean or variance of the first data, the statistical predictor 204 may predict the sample size that may be needed for the experiment to conclude with statistical significance. In some embodiments, the statistical predictor 204 may predict statistical result of the experiment at the end of the first time period of the experiment.

At (3), the sample size predictor 208 may predict sample size for each time period of the experiment. Specifically, the sample size predictor 208 may predict the sample size for the first time period is S1, the sample size for the second time period is S2, the sample size for the third time period is S3 and so forth. As indicated in FIG. 3, the predicted sample size for each time period of the experiment can be utilized to generate information fraction associated with the alpha spending function 214 for each time period of the experiment.

At (4), based on the predicted statistical result of the experiment obtained in (2) and/or the predicted sample size obtained in (3), the experiment duration predictor 206 may predict the duration (e.g., total amount of time for conducting the experiment) of the experiment. The duration of the experiment may encompass the first time period (e.g., an initial time period) and subsequent time periods. In some embodiments, the first time period is the first week of the experiment and the subsequent time periods may further include the $2^{nd}$ week to $N^{th}$ week of the experiment, where N is a positive integer greater than 1. For example, the first time period may be the first week of the experiment, a subsequent time period can be the first two weeks of the experiment, another subsequent time period can be the first three weeks of the experiment, and still another subsequent time period can be the first four weeks of the experiment, and so on.

At (5), based on the first data (e.g., experiment sample data obtained during the first week of the experiment) obtained during the first time period of the experiment and the information fraction associated with the alpha spending function 214 for the first time period, the AVP generator 210 may generate the always valid p-value (AVP) for the first time period of the experiment. In some embodiments, the AVP for the first time period may be calculated at least based on the sample size, sample mean and sample variance of the first data, and the predicted sample size for each time period of the experiment.

More specifically, the information fraction associated with the alpha spending function 214 for the first time period may be calculated by dividing the predicted sample size of the first time period by the predicted sample size of the experiment. In other words, assuming the experiment has a duration of 10 weeks, the information fraction associated with the alpha spending function 214 for the $1^{st}$ week then equals: (predicted sample size of $1^{st}$ week)/(predicted sample size from the $1^{st}$ to $10^{th}$ week). With the sample size, sample mean and variance of the first data and the information fraction associated with the alpha spending function 214 for the first time period, the AVP generator 210 may then generate the AVP for the first time period using the equation (1) discussed above.

At (6), based on the AVP for the first time period, the threshold value comparator 216 may determine the AVP for the first time period satisfies the threshold value 226 or not. In some embodiments, the threshold value has a default value of 0.05 and may be adjusted by experimenters through a user interface accessible to the experimenters during the middle of the experiment. In some embodiments, the threshold value comparator 216 may compare the AVP value for the first time period with the threshold value 226 and generate the comparison result 228 if the AVP value for the first time period is less than the threshold value 226. On the other hand, if the AVP value for the first time period is equal to or greater than the threshold value 226, the threshold value comparator 216 may not generate the comparison result 228 to indicate that the AVP for the first time period satisfies the threshold value 226 such that an early termination notification will not be triggered and the experiment would continue.

At (7), responsive to receiving the comparison result 228 that indicates the AVP value for the first time period satisfies the threshold value 226, the termination notification trigger 218 may cause a user interface to display a termination notification of the experiment. In some embodiments, the termination notification may be transmitted from a network interface (not shown in FIG. 3B) of the termination notification system 106 through the network 104 to end user devices 102 and be presented through a user interface associated with an end user device 102. Alternatively, the termination notification may be presented through a user interface (not shown in FIG. 3B) of the termination notification system 106. In some embodiments, the termination notification may be presented through a user interface element (e.g., an icon or button) on a user interface and, when clicked or selected, may cause the experiment to terminate prior to completion of the predicted duration (e.g., obtained at (3) of FIG. 3A) of the experiment.

In some embodiments, the operations at (2)-(7) may be performed by the termination notification system 106 at the end of the first time period (e.g., first week) of the experiment while the operation at (1) may be performed whenever any experiment sample data is received by the termination notification system 106 during the first time period of the experiment. In some embodiments, the AVP for the first time period generated at (5) may be stored in the AVP data store 212 for calculating always valid p-values for subsequent time periods of the experiment.

The interactions of FIG. 3A are continued with reference to FIG. 3B, where at (8) the experiment data store 202 obtains subsequent data during a second time period of the experiment that follows or ends in time after the first time period of the experiment. For example, assuming the predicted duration of the experiment is 10 weeks and the first time period is the $1^{th}$ week of the experiment, the second time period can include the subsequent weeks aggregated with all previous weeks. For example, the second time period can include the $1^{th}$ week and $2^{nd}$ week (e.g., first two weeks) of the experiment. Additionally, the second time period can be the first three weeks of the experiment, the first four weeks of the experiment, or the first five weeks of the experiment, and so forth. In other words, the second time period can include not only the subsequent weeks but also all the preceding weeks, which enables the collection of cumulative response throughout the experiment.

Thereafter, at (9), the AVP generator 210 generates the always valid p-value for the second time period. In some embodiments, the AVP generator 210 may generate the always valid p-value for the second time period based on the subsequent data (e.g., data obtained during the second time period), the information fraction associated with the alpha spending function 214 for the second time period, and the always valid p-value(s) calculated for previous time periods of the experiment. For example, assuming the predicted duration of the experiment is four weeks and the second time period is the first three weeks of the experiment, the AVP generator 210 may generate the always valid p-value for the second time period based on the subsequent data (e.g., experiment sample data obtained during the second time period or the first three weeks of the experiment), the information fraction associated with the alpha spending function 214 for the first three weeks, and the always valid p-values calculated for the 1$^{st}$ and 2$^{nd}$ weeks of the experiment, where the always valid p-values for the 1$^{st}$ and 2$^{nd}$ weeks may be stored in the AVP data store 212.

Specifically, the information fraction associated with the alpha spending function 214 for the first three weeks may be calculated by dividing the summation of predicted sample sizes throughout the first three weeks of the experiment by the predicted sample size of the four weeks of the experiment. In other words, assuming the sample size for the 1$^{st}$ week is S1, the sample size for the 2$^{nd}$ week is S2, the sample size for the 3$^{rd}$ week is S3 and the sample size for the 4$^{th}$ week is S4, the information fraction associated with the alpha spending function 214 for the first three weeks then equals: (S1+S2+S3)/(S1+S2+S3+S4). With the sample size, sample mean and variance of the experiment, sample data obtained during the first three weeks, the information fraction associated with the alpha spending function 214 for the first three weeks, and the always valid p-values for the 1$^{st}$ and 2$^{nd}$ weeks, the AVP generator 210 may then generate the AVP for the second time period using the equation (1) discussed above.

At (10), based on the AVP for the second time period, the threshold value comparator 216 may determine the AVP for the second time period satisfies the threshold value 226 or not. In some embodiments, the threshold value has a default value of 0.05 and may be adjusted by experimenters through a user interface accessible to the experimenters during the middle of the experiment. In some embodiments, the threshold value comparator 216 may compare the AVP value for the second time period with the threshold value 226 and generate the comparison result 228 if the AVP value for the second time period is less than the threshold value 226. On the other hand, if the AVP value for the second time period is not less than the threshold value 226, the threshold value comparator 216 may not generate the comparison result 228 to indicate that the AVP for the second time period satisfies the threshold value 226.

At (11), responsive to receiving the comparison result 228 that indicates the AVP value for the second time period satisfies the threshold value 226, the termination notification trigger 218 may cause a user interface to display a termination notification of the experiment. In some embodiments, the termination notification may be transmitted from a network interface (not shown in FIG. 3B) of the termination notification system 106 through the network 104 to end user devices 102 and be presented through a user interface associated with an end user device 102. Alternatively, the termination notification may be presented through a user interface (not shown in FIG. 3B) of the termination notification system 106. In some embodiments, the termination notification may be presented through a user interface element (e.g., an icon or button) on a user interface and, when clicked or selected, may cause the experiment to terminate prior to completion of the predicted duration (e.g., obtained at (3) of FIG. 3A) of the experiment.

Then, at (12), interactions depicted at (8)-(11) may be repeated for each subsequent time periods of the experiment that follows or ends in time after the second time period. In some embodiments, if experimenters terminate the experiment responsive to receiving the termination notification generated at (11), the experiment may terminate and the interactions of FIG. 3B may end at (11). If, however, the experiment is not terminated and there are subsequent time periods following the second time period, interactions at (8)-(11) may be repeated for a subsequent time period.

As described above, in some embodiments, the first time period (e.g., first week of the experiment) may be a subset in time of the second time period (e.g., first six weeks of the experiment). In some embodiments, the first time period and the second time period may partially overlap in time with each other. For example, the first time period may be the first two weeks of the experiment and the second time period may be the second week and third week of the experiment. In other embodiments, the first time period and the second time period may be non-overlapping in time with each other and contiguous in time with each other. For example, the first time period may be the first week of the experiment and the second time period may be the second week of the experiment. In still other embodiments, the first time period and the second time period may be non-overlapping in time with each other and not contiguous in time with each other. For example, the first time period can be the first week of the experiment and the second time period can be the third week of the experiment.

Figure 3C:
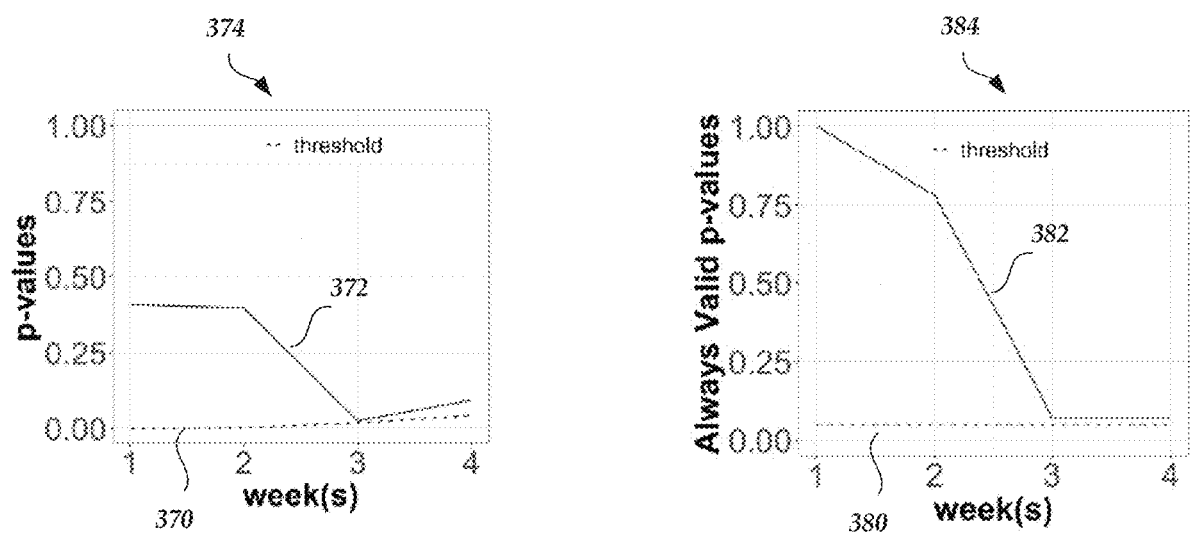
FIG. 3C illustrate example statistical charts, generated by the termination notification system of FIG. 2, that may be presented through user interfaces, such as the user interfaces of the end user devices of FIG. 1.

FIG. 3C illustrate example statistical charts that may be generated by the termination notification system 106 of FIG. 2 to be presented through user interfaces, such as the user interfaces of the end user devices 102 of FIG. 1. In some embodiments, the example statistical charts may be displayed through a user interface in response to a click or selection of a user interface element (e.g., an icon or button) of the user interface.

Shown in the left of FIG. 3C is the chart 374 that illustrates an integration of alpha spending function approach and p-values, which results in alpha values 370 increasing over time. As illustrated in chart 374, the p-value 372 for third 3$^{rd}$ week approaches but does not drop below the alpha value 370 for the 3$^{rd}$ week. As such, the experiment proceeds to the 4$^{th}$ week, where the p-value 372 goes up more than the increase of the alpha value 370.

Shown in the right of FIG. 3C is the chart 384 that illustrates the always valid p-values 382 and the alpha value 380 generated by using the equation (1) discussed above. As illustrated in chart 384, by combining the alpha spending function approach with the AVP process, the always valid p-values 382 (e.g., adjusted p-values) may be generated while keeping the significance level, alpha, to be displayed at a constant value through a user interface. Advantageously, with the alpha value 380 being flat, it may be easier for experimenters to view, compare, and/or interpret the always valid p-values 382 and the alpha value 380 through the chart 384.

Figure 4:
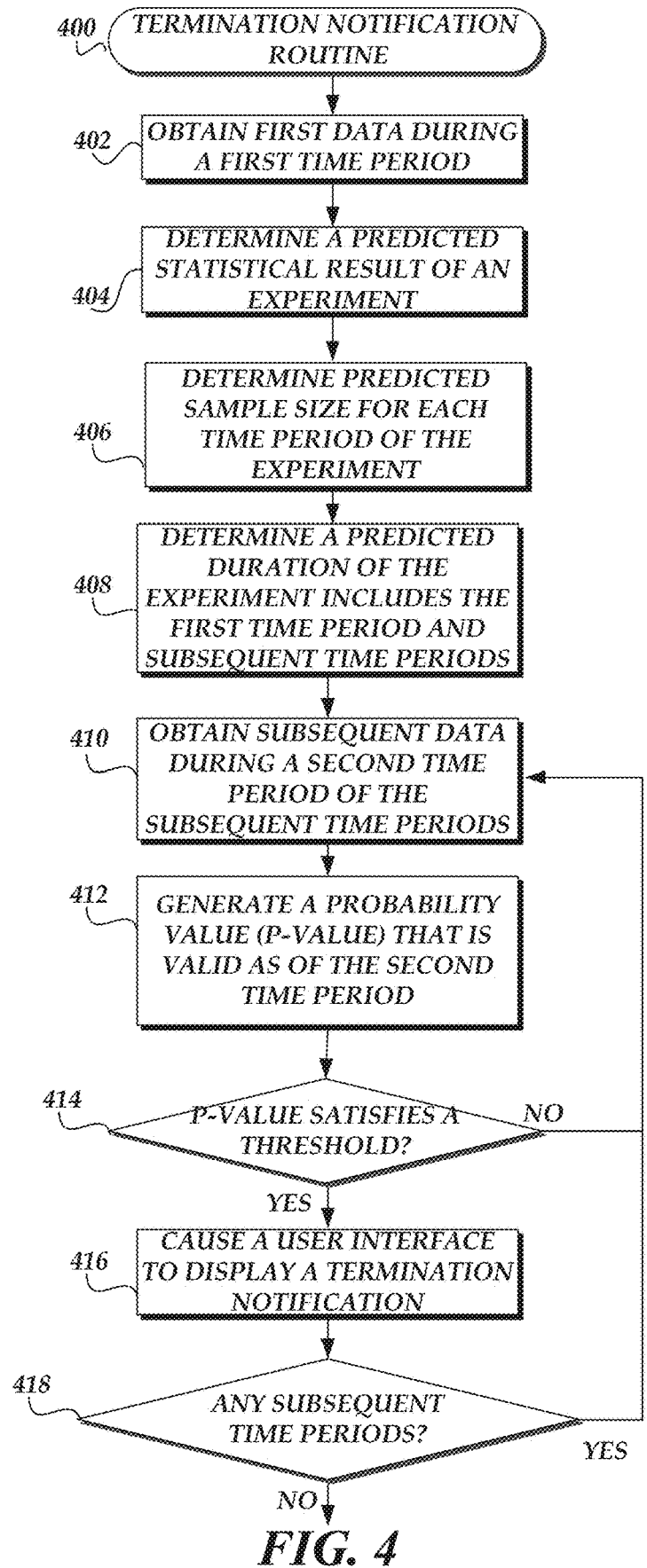
FIG. 4 illustrates an example routine for causing a user interface to display a termination notification in accordance with some embodiments of the present disclosure.

With reference to FIG. 4, an illustrative routine 400 for generating termination notification of network-based or online experiments using adjusted p-values with alpha spending function approach to control Type I error will be described. The routine 400 may be implemented, for example, by the termination notification system 106 of FIG. 2. The routine 400 may allow the termination notification system 106 to cause presentation through user interfaces a termination notification.

The routine 400 begins at block 402, where the termination notification system 106 obtains first data during a first time period of an experiment. For example, the experiment data store 202 may obtain and store the first data during the first time period of the experiment. In some embodiments, the first time period may be the first week of the experiment and the obtaining and/or storing the first data may be continually performed (e.g., whenever a new experiment data sample comes in) throughout the first week of the experiment.

At block 404, the termination notification system 106 determines a predicted statistical result of the experiment. More specifically, the statistical predictor 204 may predict statistical result of the experiment based on the first data obtained during the first time period of the experiment. For example, based on sample size or mean or variance of the first data, the statistical predictor 204 may predict the sample size that may be needed for the experiment to conclude with statistical significance. In some embodiments, the statistical predictor 204 may predict statistical result of the experiment at the end of the first time period of the experiment.

At block 406, the sample size predictor 208 of the termination notification system 106 may predict sample size for each time period of the experiment. For example, the sample size predictor 208 may predict the sample size for the first week of the experiment, the first two weeks of the experiment, the first three weeks of the experiment, and so forth.

At block 408, the termination notification system 106 may determine that a predicted duration of the experiment includes the first time period and one or more subsequent time periods that follow the first time period. Specifically, based on the predicted statistical result of the experiment, the experiment duration predictor 206 may predict that the duration of the experiment includes the first time period and subsequent time periods. For example, the experiment duration predictor 206 may predict the experiment needs to be conducted for one week, two weeks, three weeks, or four weeks.

Additionally and optionally, the termination notification system 106 may generate the always valid p-value (AVP) for the first time period of the experiment based on the first data (e.g., experiment sample data obtained during the first week of the experiment) obtained during the first time period of the experiment and the information fraction associated with the alpha spending function 214 for the first time period. The always valid p-value for the first time period may be stored in the AVP data store 212 for generating the always valid p-values for subsequent time periods of the experiment.

In some embodiments, the information fraction associated with the alpha spending function 214 for the first time period (e.g., first week of the experiment) may be the predicted sample size of the first time period (obtained at block 408) divided by a predicted sample size of the experiment. Advantageously, deriving the information fraction associated with the alpha spending function 214 based on the predicted sample size of each of the time period of the experiment enables the termination notification system 106 to reflect the traffic pattern associated with a particular experiment, potentially increasing the efficiency of the termination notification system 106 by terminating an experiment earlier when sufficient data sample is accumulated during earlier stage of the experiment.

At block 410, the experiment data store 202 of the termination notification system 106 obtains subsequent data during a second time period of the subsequent time periods of the experiment. For an experiment that has a predicted duration of four weeks, the second time period may be the first two weeks of the experiment, the first three weeks of the experiment or the overall four weeks of the experiment.

At block 412, the termination notification system 106 generates a probability value (e.g., an adjusted p-value) that is valid as of the second time period. Specifically, the probability value may be an always valid p-value for the second time period generated by the AVP generator 210 based on the subsequent data (e.g., data obtained during the second time period), the information fraction associated with the alpha spending function 214 for the second time period, and the always valid p-value(s) calculated for previous time periods of the experiment. In some embodiments, the adjusted p-value may be generated based on a predetermined schedule (e.g., at an end of the second time period) rather than continually as new experiment sample data comes in.

At block 414, the termination notification system 106 determines if the probability value (e.g., an adjusted p-value) generated at block 412 satisfies a threshold value. Specifically, the threshold value comparator 216 may compare the probability value with a threshold value and generate a comparison result 228 accordingly. In some embodiments, the probability value satisfies the threshold value when the probability value is smaller than the threshold value.

The routine 400 then varies according to whether the probability value (e.g., an adjusted p-value) satisfies the threshold value or not, as determined at block 414. In the instance that the probability value does not satisfy the threshold value, block 414 evaluates as "No" and the routine 400 returns to block 410, where the termination notification system 106 obtains subsequent data during a next time period (assuming there is another time period of the experiment following the second time period).

In the instance that the probability value satisfies the threshold, then block 414 evaluates as "Yes" and the routine 400 proceeds to block 416, where the termination notification trigger 218 of the termination notification system 106 causes a user interface to display a termination notification to experimenters. In some embodiments, the termination notification may be presented through a user interface to be displayed to experimenters as will be illustrated in FIG. 5. After causing the termination notification to be displayed, the routine 400 may proceed to block 418.

At block 418, the termination notification system 106 determines if there are any subsequent time periods for the experiment. The routine 400 may then also vary according to whether there are any subsequent time periods following the second time period, as determined at block 418. In the instance that there are any subsequent time periods following or extending beyond the second time period, then block 418 evaluates as "Yes" and the routine 400 returns to block 410, where the termination notification system 106 obtains subsequent data, generates more probability value(s) and so on as described in more detail above with respect to block 410, 412, 416 and 416. In the instance there is no subsequent time periods following the second time period, then block 418 evaluates as "No" and the routine 400 may proceed to an end or other stages (not shown in FIG. 4). After implementing the aforementioned blocks, thereby allowing the termination notification system 106 to trigger early termination notification through a user interface without inflating Type I error, the routine 400 may end.

FIG. 5 illustrates an example user interface 500 for presenting early termination notification and other statistical results generated by a termination notification system, such as the termination notification system 106 of FIG. 2. The user interface 500 may be presented through a display of the termination notification system 106 of FIG. 2 or a display of an end user device 102 of FIG. 1. As illustrated in FIG. 5, the example user interface 500 may be a content page (e.g., a network page, a web page, etc.) based user interface accessible to experimenters through various network browsers (e.g., web browsers) or application programs.

As shown in FIG. 5, portion 502 displays to experimenters that the statistical method utilized in statistical analysis associated with an experiment. Portion 504 shows that the predicted duration of the experiment is eight weeks and portion 506 shows that the experiment is currently at its fifth week. Notably, portion 508 recommends to experimenters that the experiment can be terminated early due to significant treatment effect, thereby giving experimenters the flexibility to terminate the experiment now (e.g., in the fifth week) before the completion of the predicted duration (e.g., eight weeks). Portion 510 further displays more detailed statistical metrics generated by the termination notification system 106, including sample mean (e.g., 18.429) of the experiment, percentage of change associated with a treatment (e.g., 0.051%), the p value (e.g., 0.03) as of the current week (e.g., the fifth week of the experiment) and the always valid p-value (e.g., 0.04) as of the current week.

Although not readily observed from FIG. 5, the early termination notification in portion 508 may be generated based on comparing a threshold value (e.g., user-defined Type I error rate for the experiment) with an adjusted p-value generated by the equation (1) mentioned above. As such, the Type I error rate of the experiment may be controlled below the threshold value. As shown in FIG. 5, the threshold value may be adjusted by experimenters through interaction with the portion 514 ("ADJUST TYPE I ERROR RATE"). In some embodiments, the default value of the threshold value is 0.05 and experimenters may adjust the threshold value during the middle of the experiment by interacting with the portion 514. Advantageously, by changing the threshold value, experimenters may adjust the Type I error rate of the experiment.

Additionally, experimenters may view changes of the always valid p-value from the first week of the experiment to the fifth week by interacting with the portion 512 ("VIEW AVP VALUE CHART"). In some embodiments, by interacting with the portion 512, a chart similar to the chart 374 of FIG. 3C may be displayed to the experimenters through the user interface 500. Optionally, the user interface 500 may further include a user interface element (not shown in FIG. 5) that allows experimenters to terminate an experiment prior to the completion of the predicted duration, in particular responsive to receiving the early termination notification through portion 508.

Figure 6:
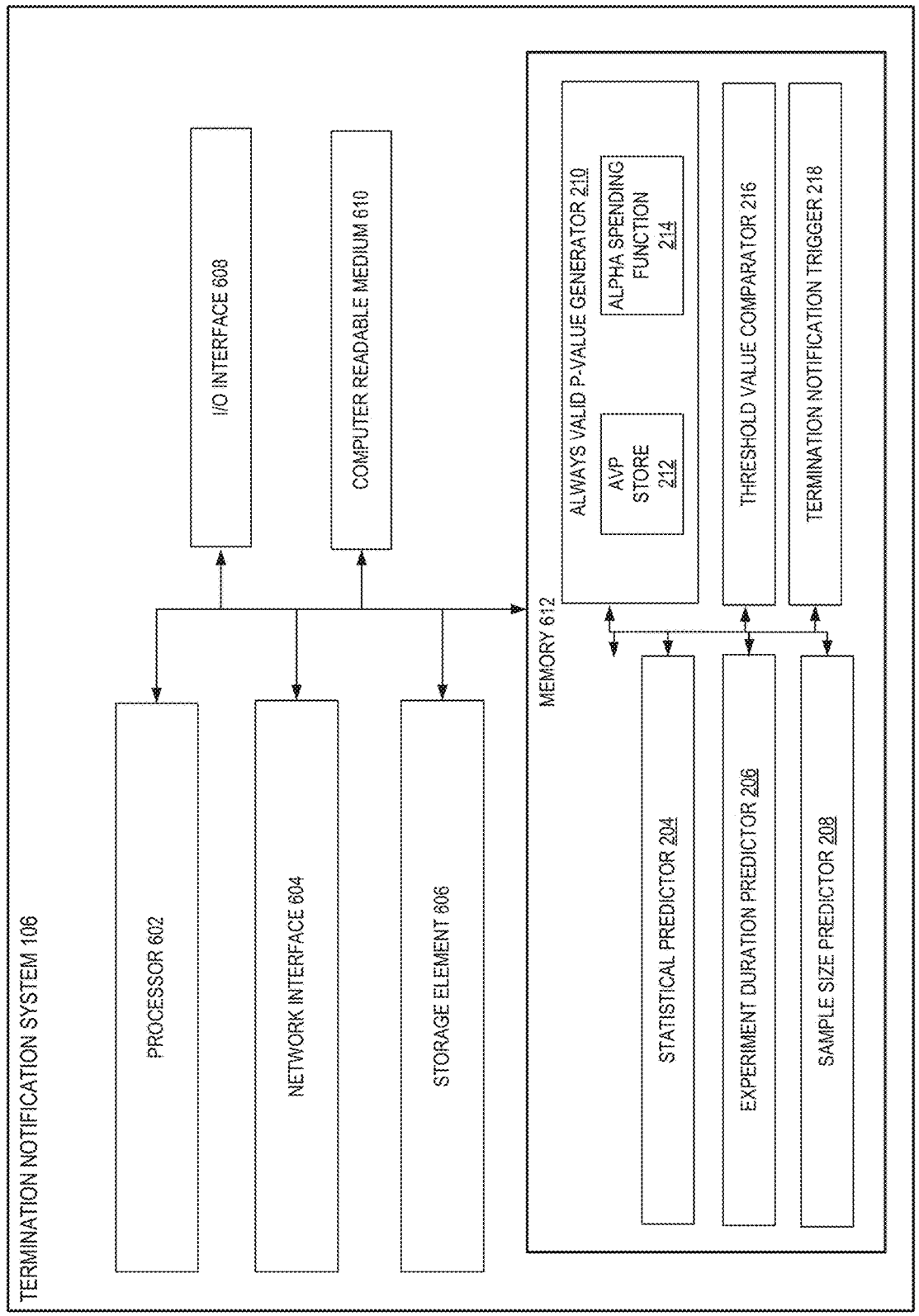
FIG. 6 depicts a general architecture of a termination notification system that is capable of triggering termination notification of an experiment in accordance with some embodiments of the present disclosure.

FIG. 6 depicts an example architecture of a computing device (e.g., the termination notification system 106) that can be used to perform one or more of the techniques described herein or illustrated in FIGS. 1-5. The general architecture of the termination notification system 106 depicted in FIG. 6 includes an arrangement of computer hardware and software modules that may be used to implement one or more aspects of the present disclosure. The termination notification system 106 may include many more (or fewer) elements than those shown in FIG. 6. It is not necessary, however, that all of these elements be shown in order to provide an enabling disclosure.

As illustrated, the termination notification system 106 includes a processor 602, a memory 612, a computer readable medium 610, a network interface 604, a storage element 606, and I/O interface 608, all of which may communicate with one another by way of a communication bus. The network interface 604 may provide connectivity to one or more networks or computing systems, such as the network 104 and/or network 108 of FIG. 1. The processor 602 may thus receive information and instructions from other computing systems or end user devices 102 illustrated in FIG. 1.

The processor 602 may also communicate with memory 612. The memory 612 may contain computer program instructions (grouped as modules or units in some embodiments) that the processor 602 executes in order to implement one or more aspects of the present disclosure. The memory 612 may include random access memory (RAM), read only memory (ROM), and/or other persistent, auxiliary, or non-transitory computer-readable media. Additionally, the memory 612 can be implemented using any suitable memory technology (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). The memory 612 may store an operating system (not shown in FIG. 6) that provides computer program instructions for use by the processor 602 in the general administration and operation of the termination notification system 106.

Additionally, the memory 612 may further include computer program instructions and other information for implementing one or more aspects of the present disclosure, including but not limited to the statistical predictor 204, the experiment duration predictor 206, the sample size predictor 208, the always valid p-value generator 210 that includes the AVP data store 212 and the alpha spending function 214, the threshold value comparator 216 and the termination notification trigger 218. The processor 602 may execute the instructions or program code stored in the memory 612 to perform statistical analysis disclosed herein, such as generating adjusted p-values at predetermined time instants (e.g., at an end of each time period of an experiment) based on alpha spending function approach. In some embodiments, parts or all of the statistical predictor 204, the experiment duration predictor 206, the sample size predictor 208, the always valid p-value generator 210 that includes the AVP data store 212 and the alpha spending function 214, the threshold value comparator 216 and the termination notification trigger 218 may be implemented by hardware circuitry, firmware, software or a combination thereof.

The network interface 604 may commonly support one or more wireless networking protocols (e.g., Wi-Fi/IEEE 802.11, or another wireless networking standard). However, in various embodiments, network interface 604 may support communication via any suitable wired or wireless general data networks, such as other types of Ethernet networks, for example. Additionally, network interface 604 may support communication via telecommunications/telephony networks such as analog voice networks or digital fiber communications networks, via storage area networks such as Fibre Channel SANs, or via any other suitable type of network and/or protocol.

Some or all of the statistical analysis methods described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method comprising:
   obtaining first data during a first time period of execution of an experiment;
   determining that a predicted duration of the experiment includes the first time period and subsequent time periods that end in time after the first time period;
   determining a predicted sample size of each of the first time period and the subsequent time periods;
   for a second time period of the subsequent time periods that ends in time after the first time period:

obtaining subsequent data during the second time period;

generating a second probability value of the experiment that is valid as of the second time period based on at least one of (i) the subsequent data obtained during the second time period, (ii) the predicted sample size of each of the first time period and the subsequent time periods, or (iii) individual second probability values valid as of each of the subsequent time periods that precede in time the second time period;

determining that the second probability value of the experiment that is valid as of the second time period satisfies a threshold value; and in response to determining that the second probability value of the experiment that is valid as of the second time period satisfies the threshold value, causing a user interface to display a termination notification, wherein the termination notification, when selected, causes the experiment to terminate prior to completion of the predicted duration.

2. The computer-implemented method of claim 1, further comprising generating a first probability value of the experiment that is valid as of the first time period based on at least one of (i) the first data or (ii) the predicted sample size of each of the first time period and the subsequent time periods.

3. The computer-implemented method of claim 2, wherein the first probability value of the experiment that is valid as of the first time period is a p-value.

4. The computer-implemented method of claim 3, wherein the p-value is associated with an alpha spending function.

5. The computer-implemented method of claim 4, wherein an information fraction of the alpha spending function is the predicted sample size of the first time period divided by a predicted sample size of the experiment.

6. The computer-implemented method of claim 1, further comprising
determining, based on the first data, a predicted statistical result of the experiment, wherein the predicted statistical result of the experiment comprises at least one of a predicted sample size of the experiment, a predicted mean of the predicted sample size of the experiment, or a predicted variance of the predicted sample size of the experiment.

7. The computer-implemented method of claim 6, wherein the predicted duration of the experiment is determined based on the predicted statistical result.

8. The computer-implemented method of claim 1, wherein the second probability value of the experiment that is valid as of the second time period is generated at an end of the second time period.

9. The computer-implemented method of claim 1, wherein the threshold value is adjustable through the user interface during the predicted duration of the experiment.

10. The computer-implemented method of claim 1, wherein each of the first time period and the subsequent time periods is non-overlapping in time with each other.

11. The computer-implemented method of claim 1, further comprising
in response to receiving a selection of a user interface element of the user interface, causing the user interface to display the individual second probability values valid as of each of the subsequent time periods that precede in time the second time period.

12. The computer-implemented method of claim 1, wherein the first time period is a subset in time of each of the subsequent time periods.

13. A system for presenting a termination notification of an experiment comparing a first version of a content page with a second version of the content page through a user interface, the system comprising:
one or more processors; and
a memory that stores computer-executable instructions, wherein the computer-executable instructions, when executed, cause the one or more processors to:
obtain first data during a first time period of execution of the experiment;
determine, based on the first data, a predicted statistical result of the experiment;
determine, based on the predicted statistical result, that a predicted duration of the experiment includes the first time period and subsequent time periods that end in time after the first time period;
determine a predicted sample size of each of the first time period and the subsequent time periods;
generate a first probability value of the experiment that is valid as of the first time period based on at least one of (i) the first data or (ii) the predicted sample size of each of the first time period and the subsequent time periods;
for a second time period of the subsequent time periods that ends in time after the first time period:
obtain subsequent data during the second time period;
generate a second probability value of the experiment that is valid as of the second time period based on at least one of (i) the subsequent data obtained during the second time period, (ii) the predicted sample size of each of the first time period and the subsequent time periods, (iii) the first probability value, or (iv) individual second probability values valid as of each of the subsequent time periods that precede in time the second time period;
determine that the second probability value of the experiment that is valid as of the second time period satisfies a threshold value; and
in response to determining that the second probability value of the experiment that is valid as of the second time period satisfies the threshold value, cause the user interface to display the termination notification,
wherein the termination notification, when selected, causes the experiment to terminate prior to completion of the predicted duration.

14. The system of claim 13, wherein the first probability value of the experiment that is valid as of the first time period is generated at an end of the first time period.

15. The system of claim 13, wherein the predicted statistical result of the experiment comprises at least one of a predicted sample size of the experiment, a predicted mean of the predicted sample size of the experiment, or a predicted variance of the predicted sample size of the experiment.

16. The system of claim 13, wherein the first probability value of the experiment that is valid as of the first time period is a p-value.

17. The system of claim 13, wherein the first time period is a first week of the experiment.

18. One or more non-transitory computer-readable media comprising computer-executable instructions for presenting a termination notification of an experiment, wherein the computer-executable instructions, when executed by a computer system, cause the computer system to perform operations comprising:

obtaining first data during a first time period of execution of the experiment;

determining that a predicted duration of the experiment includes the first time period and a second time period;

determining a predicted sample size of each of the first time period and the second time period;

for the second time period:
- obtaining subsequent data during the second time period;
- generating a second probability value of the experiment that is valid as of the second time period;
- determining that the second probability value of the experiment that is valid as of the second time period satisfies a threshold value; and
- in response to determining that the second probability value of the experiment that is valid as of the second time period satisfies the threshold value, cause a user interface to display the termination notification, wherein the termination notification, when selected, causes the experiment to terminate prior to completion of the predicted duration.

19. The one or more non-transitory computer-readable media of claim 18, further comprising generating a first probability value of the experiment that is valid as of the first time period based on at least one of (i) the first data or (ii) the predicted sample size of each of the first time period and the second time period.

20. The one or more non-transitory computer-readable media of claim 19, wherein the first time period is one of partially overlapping in time with the second time period, a subset of the second time period, non-overlapping and contiguous with the second time period, or non-overlapping and non-contiguous with the second time period.

* * * * *